United States Patent
Rew et al.

(10) Patent No.: US 8,489,234 B2
(45) Date of Patent: Jul. 16, 2013

(54) MOBILE ROBOT AND CONTROLLING METHOD THEREOF

(75) Inventors: Ho-Seon Rew, Seoul (KR); Dong-Hoon Yi, Seoul (KR); Young-Gie Kim, Seoul (KR); Young-Gyu Jung, Seoul (KR); Moon-Kee Chung, Seoul (KR); Jong-Il Park, Seoul (KR); Woo-Jin Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 681 days.

(21) Appl. No.: 12/669,208

(22) PCT Filed: Jul. 16, 2008

(86) PCT No.: PCT/KR2008/004164
§ 371 (c)(1),
(2), (4) Date: Jan. 15, 2010

(87) PCT Pub. No.: WO2009/001542
PCT Pub. Date: Jan. 22, 2009

(65) Prior Publication Data
US 2010/0286825 A1 Nov. 11, 2010

(30) Foreign Application Priority Data

Jul. 18, 2007 (KR) .................. 10-2007-0071896
Nov. 20, 2007 (KR) .................. 10-2007-0118843

(51) Int. Cl.
*G06F 19/00* (2011.01)
(52) U.S. Cl.
USPC ........... 700/245; 700/253; 700/255; 700/258; 318/568.12; 318/568.16

(58) Field of Classification Search
USPC ............. 700/245, 253, 255, 258; 318/568.12, 318/568.16; 901/1
See application file for complete search history.

(56) References Cited

U.S. PATENT DOCUMENTS

| 4,674,048 A | * | 6/1987 | Okumura | 701/25 |
| 5,109,566 A | * | 5/1992 | Kobayashi et al. | 15/319 |

(Continued)

FOREIGN PATENT DOCUMENTS

| JP | 2002-131426 | | 5/2002 |
| JP | 2002131426 | * | 5/2002 |

(Continued)

OTHER PUBLICATIONS

International Search Report dated Nov. 24, 2008.

*Primary Examiner* — Khoi Tran
*Assistant Examiner* — Jamie Figueroa
(74) *Attorney, Agent, or Firm* — KED & Associates LLP

(57) ABSTRACT

Disclosed are a mobile robot and a controlling method thereof. The mobile robot comprises: a case; and a sensor unit having two or more sending portions and two or more receiving portions arranged on an outer surface of the case separately and alternately. The plurality of sending portions and receiving portions are arranged in an alternating manner, thereby having a directivity. Also, since signals received through the receiving portions are judged based on a reference value, an area unallowable to be detected for an obstacle sensing is minimized, which allows an obstacle to be detected more accurately. When the obstacle corresponds to a side wall on the basis of a moving path of the mobile robot, a distance between the side wall and the mobile robot is calculated based on signals received by the receiving portion closest to the side wall. Accordingly, the mobile robot can move with maintaining a constant distance from the side wall.

19 Claims, 10 Drawing Sheets

U.S. PATENT DOCUMENTS

| | | | | |
|---|---|---|---|---|
| 5,341,540 | A * | 8/1994 | Soupert et al. | 15/319 |
| 5,822,077 | A * | 10/1998 | Sasaki et al. | 358/296 |
| 5,942,869 | A * | 8/1999 | Katou et al. | 318/568.12 |
| 6,076,025 | A * | 6/2000 | Ueno et al. | 701/23 |
| 6,172,941 | B1 * | 1/2001 | Bieramperl | 368/10 |
| 6,459,955 | B1 * | 10/2002 | Bartsch et al. | 700/245 |
| 6,515,614 | B2 * | 2/2003 | Sakai et al. | 342/70 |
| 6,605,156 | B1 | 8/2003 | Clark et al. | |
| 7,103,449 | B2 * | 9/2006 | Woo et al. | 700/251 |
| 7,970,491 | B2 * | 6/2011 | Lee et al. | 700/245 |
| 8,060,256 | B2 * | 11/2011 | Kong et al. | 700/258 |
| 2002/0075180 | A1 * | 6/2002 | Sakai et al. | 342/52 |
| 2004/0158354 | A1 * | 8/2004 | Lee et al. | 700/245 |
| 2004/0204804 | A1 | 10/2004 | Lee et al. | |
| 2006/0136097 | A1 * | 6/2006 | Kim et al. | 700/258 |
| 2007/0096676 | A1 * | 5/2007 | Im et al. | 318/587 |
| 2007/0271003 | A1 * | 11/2007 | Bang et al. | 700/245 |

FOREIGN PATENT DOCUMENTS

| | | | |
|---|---|---|---|
| KR | 10-2004-0057111 | | 7/2004 |
| KR | 10-2004-0057112 | | 7/2004 |
| KR | 10-2005-0010591 | | 1/2005 |
| KR | 10-2007-0067807 | | 6/2007 |
| KR | 1020070067807 | * | 6/2007 |

* cited by examiner (a)

(b)

(a)

(b)

(a) (b)

(a)

(b)

MOBILE ROBOT AND CONTROLLING METHOD THEREOF

TECHNICAL FIELD

The present invention relates to a mobile robot and a controlling method thereof, and more particularly, to a mobile robot capable of reducing areas unallowable to be detected for an obstacle sensing by alternately arranging a plurality of sending portions and receiving portions on an outer surface thereof, and capable of easily sensing a wall surface without additional wall surface sensors, and a controlling method thereof.

BACKGROUND ART

Generally, a mobile robot serves to clean a certain area such as a house and an office by sucking dust or foreign materials while moving.

The mobile robot comprises units of a general vacuum cleaner for sucking dust or foreign materials, a moving unit including right and left motors for moving the mobile robot, a detecting sensor for detecting various obstacles inside an area to be cleaned, and a controller for performing a cleaning process by controlling the moving unit and the detecting sensor.

The conventional mobile robot is provided with an obstacle detecting sensor for detecting obstacles positioned at a front side corresponding to a moving path. The mobile robot recognizes obstacles positioned at a front side through the obstacle detecting sensor, and then moves by avoiding the detected obstacles.

The conventional mobile robot is also provided with a wall surface detecting sensor. When the mobile robot moves or performs a cleaning process along a wall surface, the wall surface detecting sensor allows the mobile robot to perform a cleaning process without colliding with the wall surface.

However, the conventional mobile robot has a limitation in ranges and angles to detect signals reflected by obstacles, thereby not recognizing obstacles having a large reflection angle such as a rectangular pillar.

Furthermore, the conventional mobile robot has to be additionally provided with a wall surface detecting sensor as well as an obstacle detecting sensor. This causes the mobile robot to have a complicated detecting sensor system, which increases fabrication costs.

DISCLOSURE OF THE INVENTION

Therefore, it is an object of the present invention to provide a mobile robot capable of solving areas unallowable for sensing an obstacle by providing a sensor unit on an outer surface thereof, the sensor unit composed of a plurality of sending portions and receiving portions arranged in an alternating manner, and a controlling method thereof.

To achieve these and other advantages and in accordance with the first purpose of the present invention, as embodied and broadly described herein, there is provided a mobile robot, comprising: a case; and a sensor unit having two or more sending portions and two or more receiving portions arranged on an outer surface of the case separately and alternately.

According to another aspect of the present invention, the mobile robot comprises: a case; a sensor unit having two or more sending portions and two or more receiving portions arranged on an outer surface of the case separately and alternately; and a controller for detecting a position of an obstacle based on two or more signals received by the sensor unit.

To achieve these and other advantages and in accordance with the first purpose of the present invention, as embodied and broadly described herein, there is also provided a controlling method for a mobile robot, comprising: sending signals to detect an obstacle toward a moving direction of a mobile robot by using two or more sending portions separated from each other; receiving signals reflected by the obstacle by using two or more receiving portions arranged separately and alternately from the sending portions; and recognizing a position of the obstacle based on the two or more received signals.

It is another object of the present invention to provide a sensor unit for a mobile robot, and a controlling method thereof.

To achieve these and other advantages and in accordance with the second purpose of the present invention, as embodied and broadly described herein, there is provided a mobile robot, comprising: a case; a sensor unit having two or more sending portions and two or more receiving portions arranged on an outer surface of the case separately and alternately; and a controller for detecting a position of an obstacle based on two or more signals received by the sensor unit, wherein when the obstacle corresponds to a side wall on the basis of a moving path of the mobile robot, the controller calculates a distance between the side wall and the mobile robot based on signals received by the receiving portion closest to the side wall.

The controller calculates a distance between the wall surface and the mobile robot based on values detected by the sensor unit, and moves the mobile robot by constantly maintaining a distance between the wall surface and the mobile robot according to the calculated distance.

To achieve these and other advantages and in accordance with the second purpose of the present invention, as embodied and broadly described herein, there is also provided a method for controlling a mobile robot to detect an obstacle, comprising: detecting a wall surface around the mobile robot by using a sensor unit having two or more sending portions and two or more receiving portions arranged separately and alternately; and moving the mobile robot by constantly maintaining a distance between the wall surface and the mobile robot according to values detected by the sensor unit.

The foregoing and other objects, features, aspects and advantages of the present invention will become more apparent from the following detailed description of the present invention when taken in conjunction with the accompanying drawings.

MODES FOR CARRYING OUT THE PREFERRED EMBODIMENTS

Reference will now be made in detail to the preferred embodiments of the present invention, examples of which are illustrated in the accompanying drawings.

Hereinafter, preferred embodiments of the present invention will be explained in more detail with reference to the attached drawings.

Figure 1:
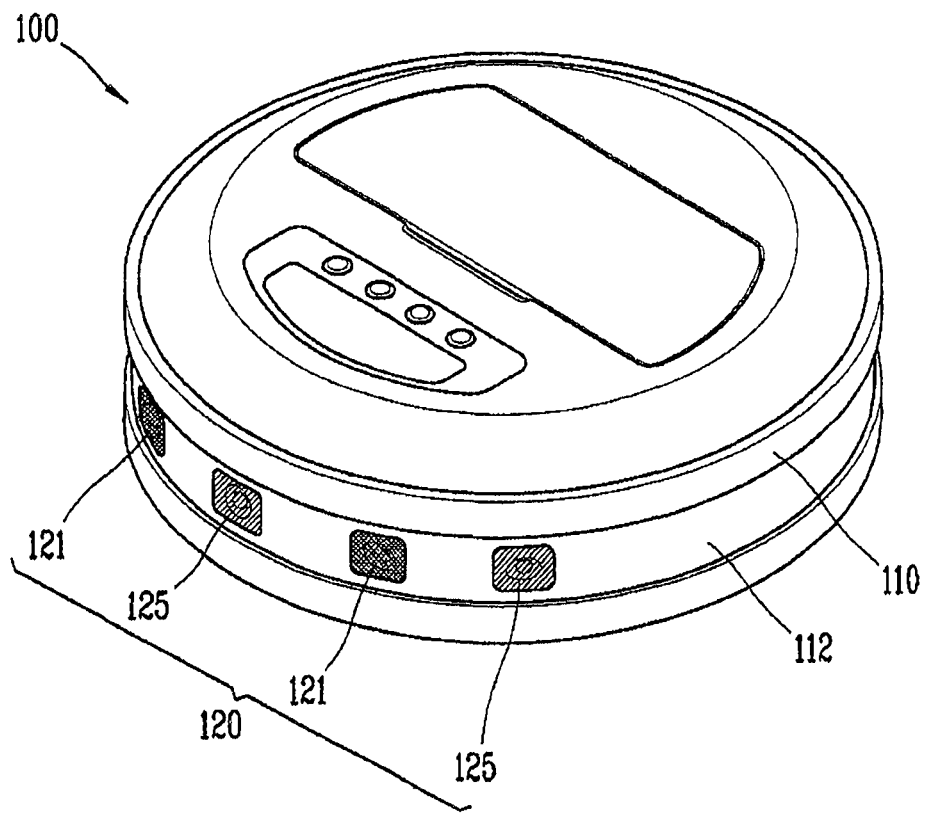
FIG. 1 is a perspective view of a mobile robot according to a first embodiment of the present invention.
Figure 2:
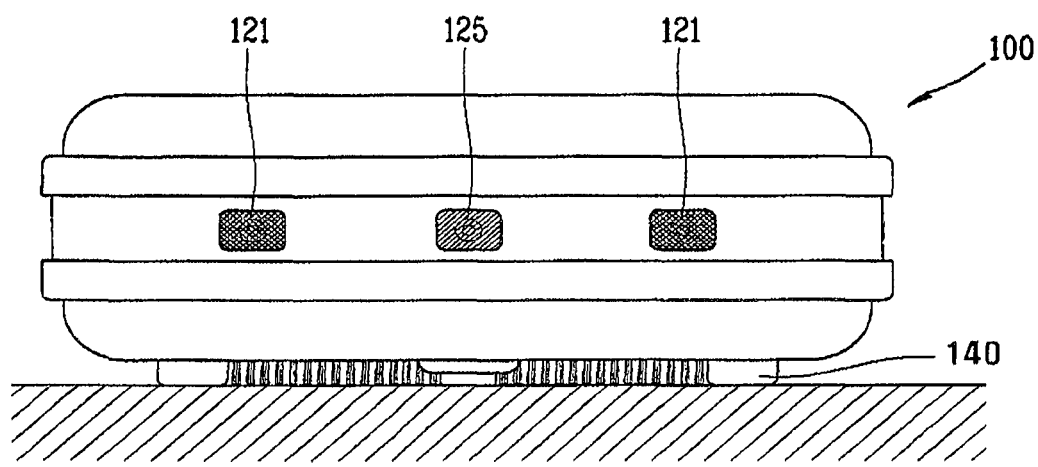
FIG. 2 is a side view of the mobile robot according to a first embodiment of the present invention.

FIG. 1 is a perspective view of a mobile robot according to a first embodiment of the present invention, and FIG. 2 is a side view of the mobile robot according to a first embodiment of the present invention.

As shown in FIGS. 1 and 2, a mobile robot 100 comprises: a case 110 that forms appearance, and a sensor unit 120 disposed at an outer side surface of the case 110, and having two or more sending portions 121 and two or more receiving portions 125. The case 110 is formed in a disc shape having a predetermined height. The sensor unit 120 serves to detect a distance between an indoor wall or an obstacle and the robot. In the present invention, the sensor unit is configured as a supersonic sensor unit.

The case 110 is provided with a bumper 112 for attenuating an impact at the time of a collision occurrence.

Figure 3:
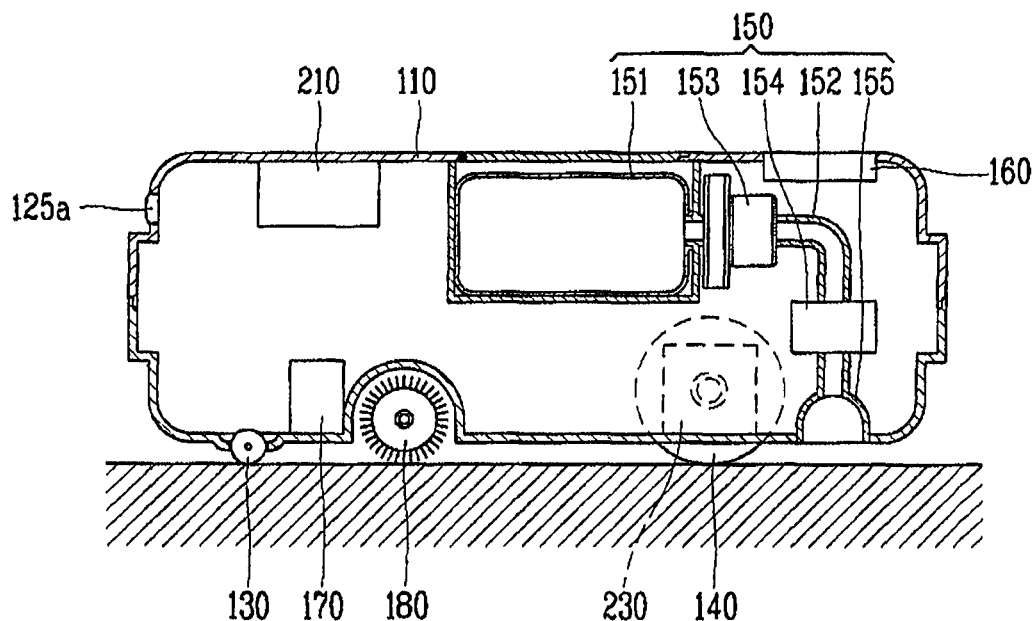
FIG. 3 is a vertical sectional view of the mobile robot according to a first embodiment of the present invention.

FIG. 3 is a vertical sectional view of the mobile robot according to a first embodiment of the present invention.

Referring to FIG. 3, the operation of the mobile robot 100 according to a first embodiment of the present invention will be explained in more detail.

The mobile robot 100 comprises a case 110, an agitator 180, a supplementary wheel 130, a driving wheel 140, a suction module 150, a manipulating unit 160, a battery 170, a sensor unit 120, a controller 210, and a driving unit 230.

An agitator receiving unit 111 and a supplementary wheel receiving unit 112 are formed at a front lower end of the case 110. The agitator 180 is rotatably installed at the agitator receiving unit 111. The agitator 180 sweeps foreign materials such as dust or dirt on the floor so that the foreign materials can be smoothly sucked to the suction module 150.

The agitator 180 can be driven by a driving unit (not shown) separated from the driving unit 230. The agitator 180 is disposed on the case 110 in front of the driving wheel 140.

The driving wheel 140 is operated by receiving a driving force from the driving unit 230. As the driving wheel 140 is operated, the mobile robot 100 moves in a forward direction.

The supplementary wheel 130 is rotatably installed at the supplementary wheel receiving unit 112. As the driving wheel 140 is operated, the supplementary wheel 130 is rotated to support the mobile robot 100 being moved.

The driving unit 230 includes a driving motor connected to the driving wheel 140 therein. The driving unit 230 transmits a driving force to the driving wheel 140 according to signals received from the controller 210.

The suction module 150 composed of a dust box 151, a suction duct 152, a filtering portion 153, a suction fan 154, and a suction opening 155 sucks foreign materials on the floor.

More concretely, as the suction fan 154 is driven, a suction force occurs. By the suction force, a negative pressure is formed around the suction opening 155, and thereby foreign materials on the floor are sucked to the suction opening 155. Then, the foreign materials are sucked to the suction duct 152 thus to pass through the filtering portion 153. The filtering portion 153 can filter specific materials among the foreign materials.

Foreign materials passing through the filtering portion 153 are received in the dust box 151. The dust box 151 may be arranged at an approximately central part of the case 110. The suction module 150 is arranged at an approximately rear end of the case 110.

The manipulating unit 160 may include keys for inputting commands for controlling the mobile robot 100. A display unit 220 (refer to FIG. 11) for displaying various kind of information of the mobile robot 100 may be installed at the manipulating unit 160.

The battery 170 supplies a driving force to the driving unit 230, etc. The battery 170 may be charged at an external charging plate (not shown). The sensor unit 120 can detect an obstacle disposed at a front side on the basis of a moving path of the mobile robot 100.

The sensor unit 120 may consist of sending portions 121*a* and 121*b* for sending signals to detect an obstacle, and receiving portions 125*a*, 125*b*, and 125*c* for receiving signals sent from the sending portions 121*a* and 121*b*, and then reflected by the obstacle.

As the sensor unit 120, a supersonic sensor, etc. may be used.

The number of the receiving portions 125*a*, 125*b* and 125*c* is larger than the number of the sending portions 121*a* and 121*b* by one or more, thereby forming receiving regions of signals.

In more detail, the receiving portions 125*a*, 125*b* and 125*c* are disposed at both sides of each of the sending portions 121*a* and 121*b*, thereby forming receiving regions of signals sent from the sending portions 121*a* and 121*b* and then reflected by the obstacle. Under this configuration, an area to be detected can be expanded while reducing the number of sensors of the sensor unit 120.

The controller 210 can recognize a distance between the wall surface and the mobile robot 100 by the sensor unit 120.

More specifically, the controller 210 calculates a distance between the side wall and the mobile robot 100 based on values detected by the sensor unit 120, and moves the mobile robot 100 by constantly maintaining a distance between the side wall and the mobile robot 100 according to the calculated distance.

Figure 4:
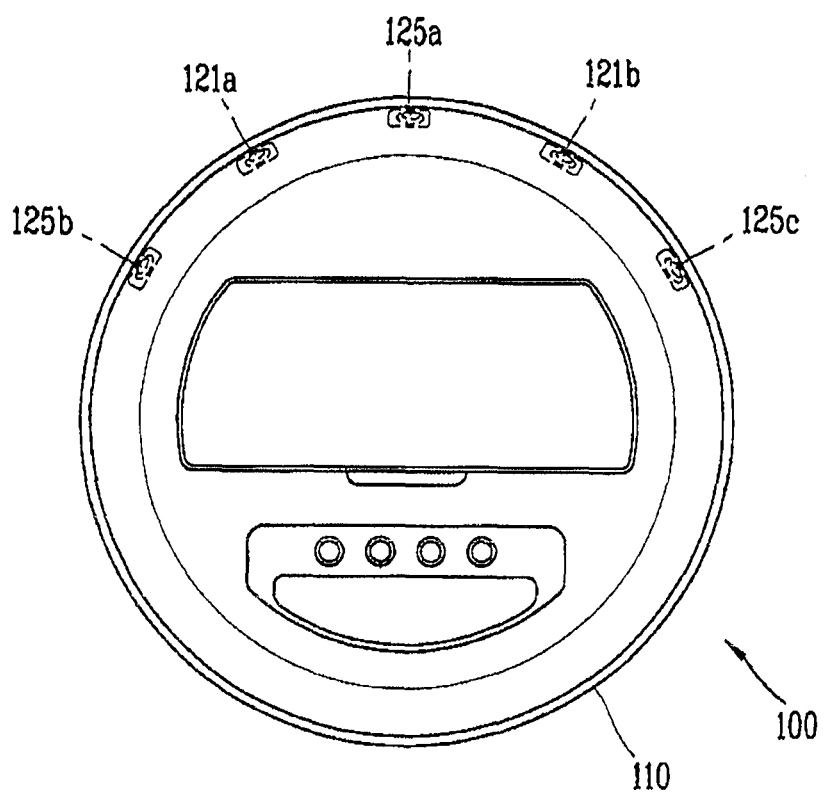
FIG. 4 is a schematic sectional view of a supersonic sensor of the mobile robot according to a first embodiment of the present invention.
Figure 5:
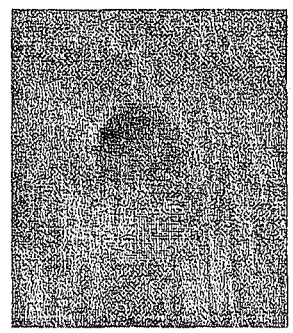
FIG. 5 is a view showing one embodiment of the supersonic sensor of FIG. 4.
Figure 5:
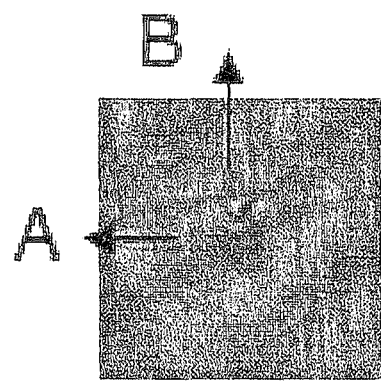

FIG. 4 is a schematic sectional view of a supersonic sensor of the mobile robot according to a first embodiment of the present invention, FIG. 5 is a view showing one embodiment of the supersonic sensor of FIG. 4, and FIGS. 6A and 6B are views showing another embodiment of the supersonic sensor of FIG. 4.

Hereinafter, the supersonic sensor unit 120 will be explained in more detail with reference to FIGS. 4 to 6.

Referring to FIG. 4, the supersonic sensor unit 120 disposed on an outer side surface of the case 110 has two or more sending portions 121, and two or more receiving portions 125. The two or more sending portions 121, and the two or more receiving portions 125 are disposed on an outer surface of the case 110 separately and alternately. As signals emitted from the mobile robot in various angles and then reflected to an obstacle are received in various angles, areas unallowable to be detected for an obstacle sensing can be reduced by detecting a reflection angle from a wall surface.

More specifically, the receiving portions 125 include a first receiving portion 125a disposed at a front center of the case 110, a second receiving portion 125b disposed at a left side of the first receiving portion 125a with a spacing distance therebetween, and a third receiving portion 125c disposed at a right side of the first receiving portion 125a with a spacing distance therebetween. Here, the first receiving portion 125a is set to have a receiving sensitivity lower than that of the second receiving portion 125b and the third receiving portion 125c.

The sending portions 121 are configured so as to be separately disposed at right and left sides of the front center of the case 110, respectively. That is, one or more first sending portions 121a are disposed between the first receiving portion 125a and the second receiving portion 125b, and one or more second sending portions 121b are disposed between the first receiving portion 125a and the third receiving portion 125c. The sending portions 121 simultaneously send supersonic waves through the first and second sending portions 121a and 121b.

Here, an emitting angle of supersonic waves through the first and second sending portions 121a and 121b is maintained as an emitting angle not to influence on different signals, thereby preventing a cross-talk occurrence.

FIG. 5 is a view showing sending portions and receiving portions of the supersonic sensor 120 of FIG. 4, in which FIG. 5A shows sending portions and FIG. 5B shows receiving portions.

Referring to FIG. 5A, the sending portions 121 consist of first and second sending portions 121a and 121b, each having a horn shape. Here, the first and second sending portions 121a and 121b are formed so that each outer end can have an oval shape, in which a long axis of the oval shape becomes an axial direction (B) of a longitudinal section.

Since a short axis of the oval shape is parallel to a horizontal direction (A) of the mobile robot 100, a relatively wider area can be detected in the horizontal direction (A) of the mobile robot 10. Accordingly, the mobile robot 100 can move even to a low space such as an area below a bed or a sofa.

The first receiving portion 125a is set to have a receiving sensitivity low enough to detect an obstacle when the mobile robot 100 moves to a low space such as an area below a bed or a sofa. Here, since the second receiving portion 125b and the third receiving portion 125c have to detect an obstacle at the time of a normal moving, they are set to have a receiving sensitivity higher than that of the first receiving portion 125a.

Referring to FIG. 5B, the receiving portions 125 are provided with a condenser microphone in a scanning manner. Here, the condenser microphone is operated as follows. Once a vibration plate is vibrated by sound (supersonic waves), the condenser microphone has a varied capacity thus to have a varied accumulation charge. As a result, a current flows by sound variation. Here, as the controller detects the current, supersonic waves received through the receiving portions 125 can be detected.

Figure 6:
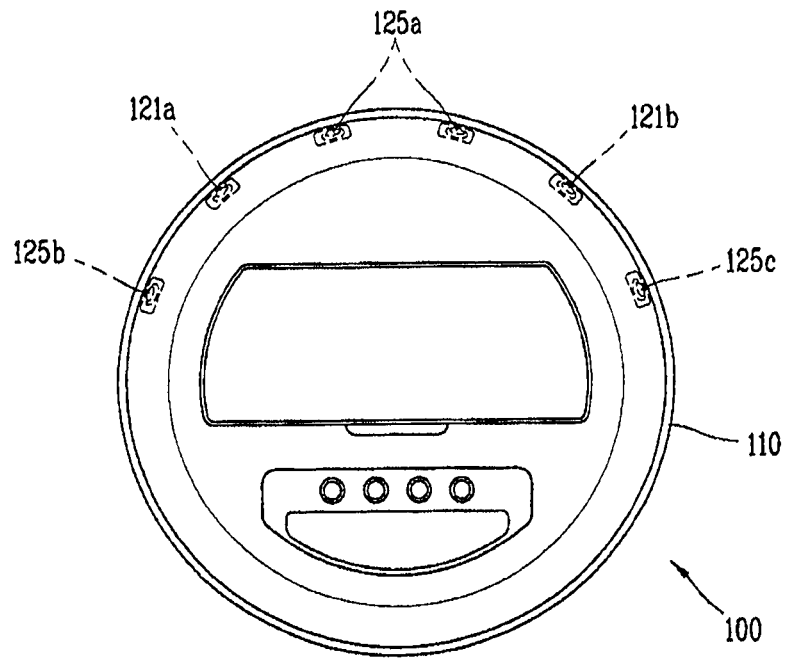
FIG. 6 is a view showing another embodiment of the supersonic sensor of FIG. 4
Figure 6:
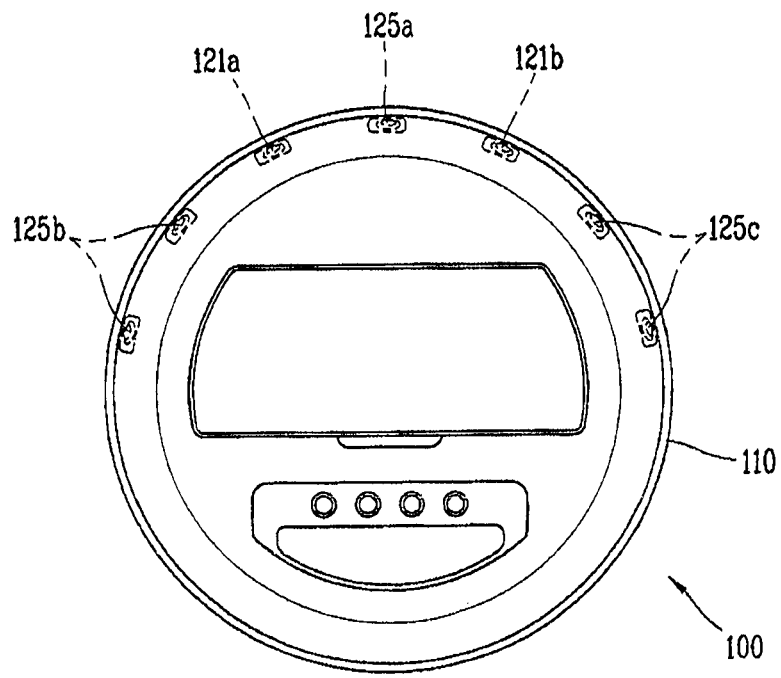

FIG. 6 is a view showing another embodiment of the supersonic sensor of FIG. 4. FIG. 6A shows the first receiving portion 125a is configured in two in number, and FIG. 6B shows the second and third receiving portions 125b and 125c are configured in two in number, respectively.

As shown in FIG. 6, the receiving portions 125 include one or more first receiving portions 125a, second receiving portions 125b, and third receiving portions, respectively. That is, as shown in FIG. 6A, as the first receiving portions 125a are provided at a central portion in one or more in number, a receiving sensitivity of the central portion is enhanced. As shown in FIG. 6B, one or more second receiving portions 125b and one or more third receiving portions 125c are provided at left and right sides, respectively. Accordingly, an obstacle of various angles can be detected.

As shown in FIGS. 6A and 6B, the number of the first receiving portions 125a, the second receiving portions 125b, and the third receiving portions 125c may be varied. In the same manner, the number of the sending portions 121 may be varied.

Figure 7:
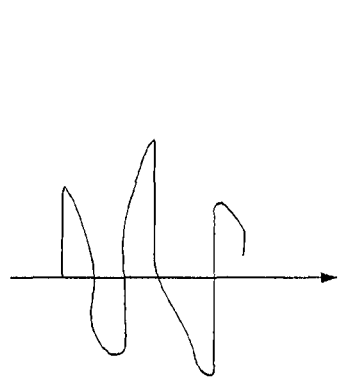
FIG. 7 is a view showing reception signals of the supersonic sensor according to a first embodiment of the present invention.
Figure 7:
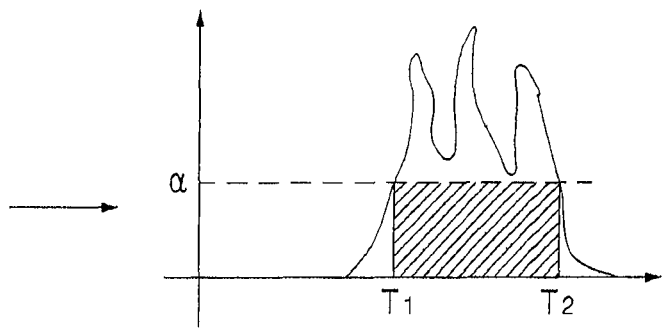

FIG. 7 is a view showing signals detected through the receiving portions according to a first embodiment of the present invention.

FIG. 7A shows an analogue signal implemented as supersonic signals received through the receiving portions are converted. As shown in FIG. 7B, received signals are amplified through an amplifier, and then passes through a band pass filter to be filtered.

Here, the controller compares a level of a filtered signal with a reference level ($\alpha$) based on the filtered signal. The controller calculates a Time Of Flight ("TOF") corresponding to a time duration from a time (T1) that a filtered signal exceeds a reference level ($\alpha$) to a time (T2) that the filtered signal falls below the reference level ($\alpha$) (T2). Also, the controller detects a distance and a direction of an obstacle based on the calculated 'TOF' value. A preferred embodiment for detecting an obstacle based on the 'TOF' value will be explained with reference to FIGS. 8 and 9.

Figure 8:
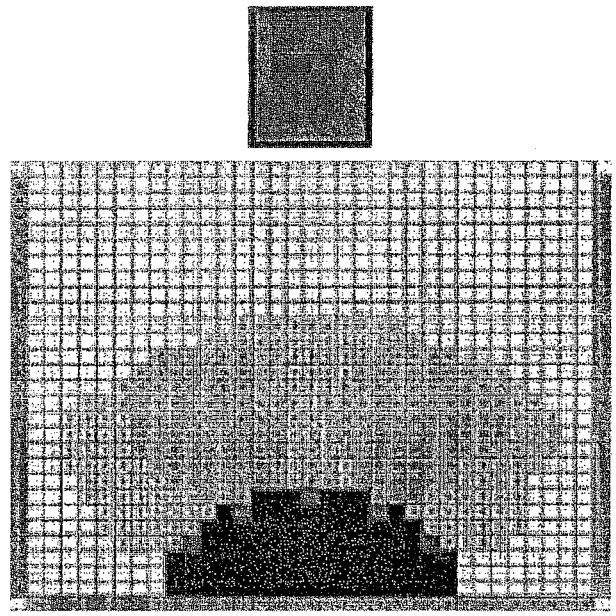
FIGS. 8 and 9 are graphs showing signals received by the supersonic sensor according to a first embodiment of the present invention.
Figure 8:
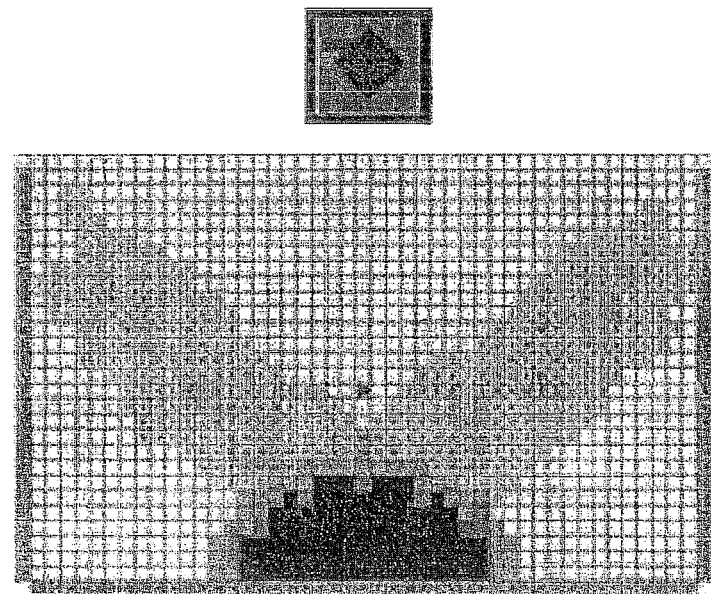

FIG. 8 shows a preferred embodiment of the supersonic sensor of FIG. 4. FIG. 8A shows a 'TOF' value calculated from a signal detected with respect to a cylindrical obstacle, whereas FIG. 8B shows a 'TOF' value calculated from a signal detected with respect to a polygonal obstacle.

Figure 9:
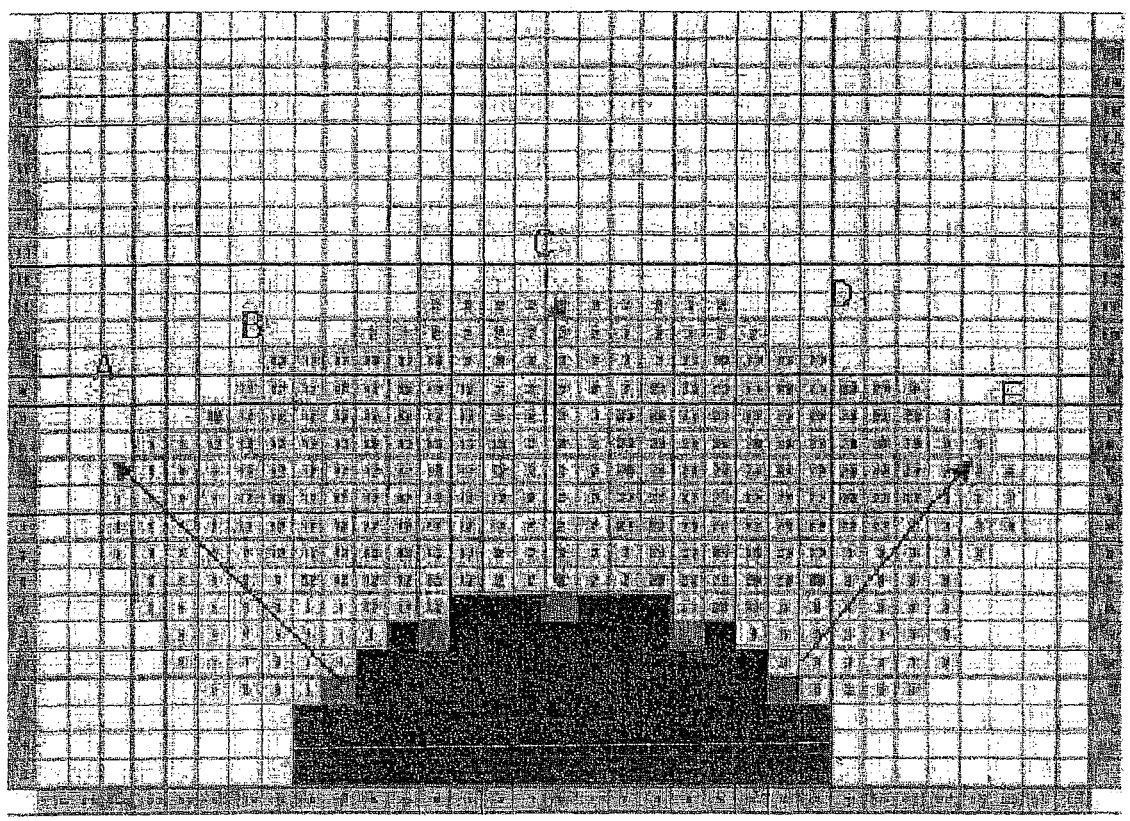

FIG. 9 is referred so as to explain FIG. 8A in more detail.

Referring to FIG. 9, a black shape at a lower center denotes the shape of the mobile robot 100, and each value denotes each 'TOF' value at each region ('A' to 'E'). Here, the first receiving portion 125a of the receiving portion 125 is provided at the end of 'C', the central portion. The second receiving portion 125b is provided at the end of 'A', and the third receiving portion 125c is provided at the end of 'E'.

The first sending portion 121a is provided at the end of 'B', and the second sending portion 121b is provided at the end of 'D'.

Once supersonic waves are emitted from the first and second sending portions 121a and 121b, the emitted signals are reflected by an obstacle, and then are received through the first, second, and third receiving portions 125a, 125b, and 125c. The controller calculates a 'TOF' value of signals received through the receiving portion, and then identifies the regions 'A' to 'E' from each other.

The controller sets each receiving angle of the first, second, and third receiving portions 125a, 125b, and 125c with respect to signals received from the regions 'A, C and E'. Also, the controller calculates each distance of an obstacle from the first, second and third receiving portions 125a, 125b and 125c, based on each 'TOF' value of the regions 'A to E'. The controller detects a direction of an obstacle from the mobile robot 100, based on each 'TOF' value of the regions 'B' and 'D' where the first and second sending portions 121a and 121b are provided. Here, the controller may detect a shape of an obstacle based on a 'TOF' value calculated with respect to the obstacle.

Referring to FIG. 8B, a distance and a direction of the polygonal obstacle may be calculated based on a 'TOF' value calculated with respect to the obstacle, and a shape of the polygonal obstacle can be detected from regions of detected signals.

The first to third sending portions are implemented as supersonic sensors. However, the sensor unit is not limited to the supersonic sensor, but may include all sensors for receiving reflected signals.

Hereinafter, the operation of the mobile robot will be explained in more detail.

Firstly, the sending portions 121 of the sensor unit 120 send supersonic waves through two or more sensors. Here, the supersonic waves are emitted to predetermined regions.

The emitted supersonic waves are reflected by an obstacle, and then are received through the first, second and third receiving portions 125a, 125b and 125c.

The controller calculates a 'TOF' value based on a received time, a level, etc. of each signal received through the first, second and third receiving portions 125a, 125b, and 125c. Here, the controller compares a level of a received signal with a preset reference level ($\alpha$). Then, the controller calculates a Time Of Flight ("TOF") corresponding to a time duration from a time (T1) that a level of a received signal exceeds the reference level ($\alpha$) to a time (T2) that the level of the received signal falls below the reference level ($\alpha$) (T2).

Also, the controller detects a distance and a direction of an obstacle based on the calculated 'TOF' value, thereby controlling motion of the mobile robot 100.

A sensor unit for a mobile robot, and a controlling method according to another embodiment will be explained with reference to the attached drawings.

Figure 10:
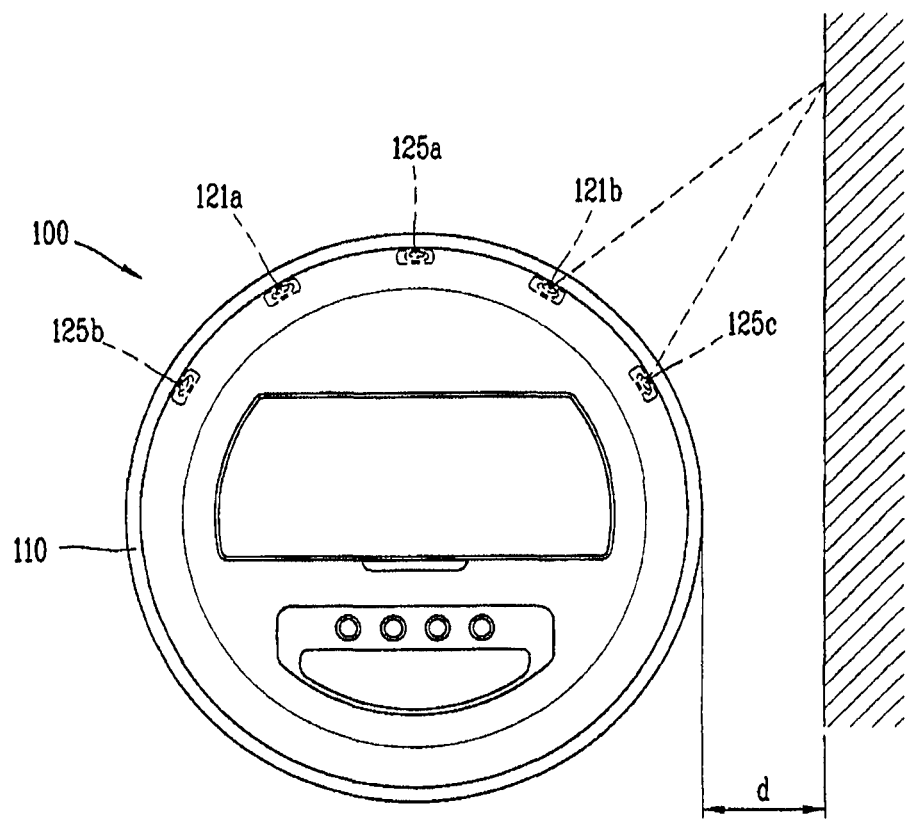
FIG. 10 is a view showing that a mobile robot according to another embodiment of the present invention moves along a wall surface.

FIG. 10 is a view showing that a sensor unit for a mobile robot according to another embodiment of the present invention is operated. More concretely, FIG. 10 shows that a sensor unit for a mobile robot according to another embodiment of the present invention moves along a wall surface.

While the mobile robot 100 moves, signals sent from the first and second sending portions 121a and 121b of the sensor unit 120 are reflected to the wall surface. Then, the reflected signals are received by some of the first, second, and third receiving portions 125a, 125b, and 125c.

Based on values of the received signals, the controller 210 calculates a distance between the wall surface and the mobile robot 100. And, the controller 210 can move the mobile robot 100 with constantly maintaining a distance between the wall surface and the mobile robot 100.

The controller may calculate a distance between the wall surface and the mobile robot 100, based on values detected by one pair of portions composed of one of the first, second, and third receiving portions 125a, 125b and 125c, and one of the first and second sending portions 121a and 121b, e.g., the second sending portion 121b and the third receiving portion 125c adjacent to the wall surface.

As aforementioned, the mobile robot 100 according to the present invention can move with constantly maintaining a distance between the wall surface by using the sensor unit 120 without an additional sensor for detecting the wall surface. Accordingly, the mobile robot 100 can implement the sense unit having a simplified configuration, and can reduce the fabrication cost.

Figure 11:
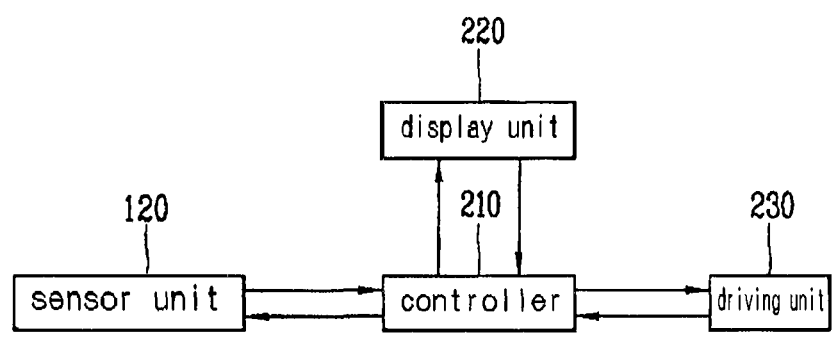
FIG. 11 is a block diagram showing a configuration of a sensor unit for a mobile robot according to another embodiment of the present invention.

FIG. 11 is a block diagram showing a configuration of a sensing apparatus for a mobile robot according to another embodiment of the present invention.

Referring to FIG. 11, the mobile robot 100 according to the present invention has a sensing apparatus composed of a sensor unit 120, a controller 210, a display unit 220, and a driving unit 230.

The sensor unit 120 may detect a wall surface near the mobile robot 100.

The controller 210 may calculate a distance from the wall surface sensed by the sensor unit 120. Also, the controller 210 may compare the calculated distance with a reference distance, and then transmit command signals to the driving unit 230.

The reference distance may be a predetermined value, or may be an initial value or an average value, etc. calculated while the mobile robot 100 moves along the wall surface.

The display unit 220 may display each kind of information of the mobile robot 100, such as an operational state, an operation mode, etc. according to the command signals transmitted from the controller 210.

Figure 12:
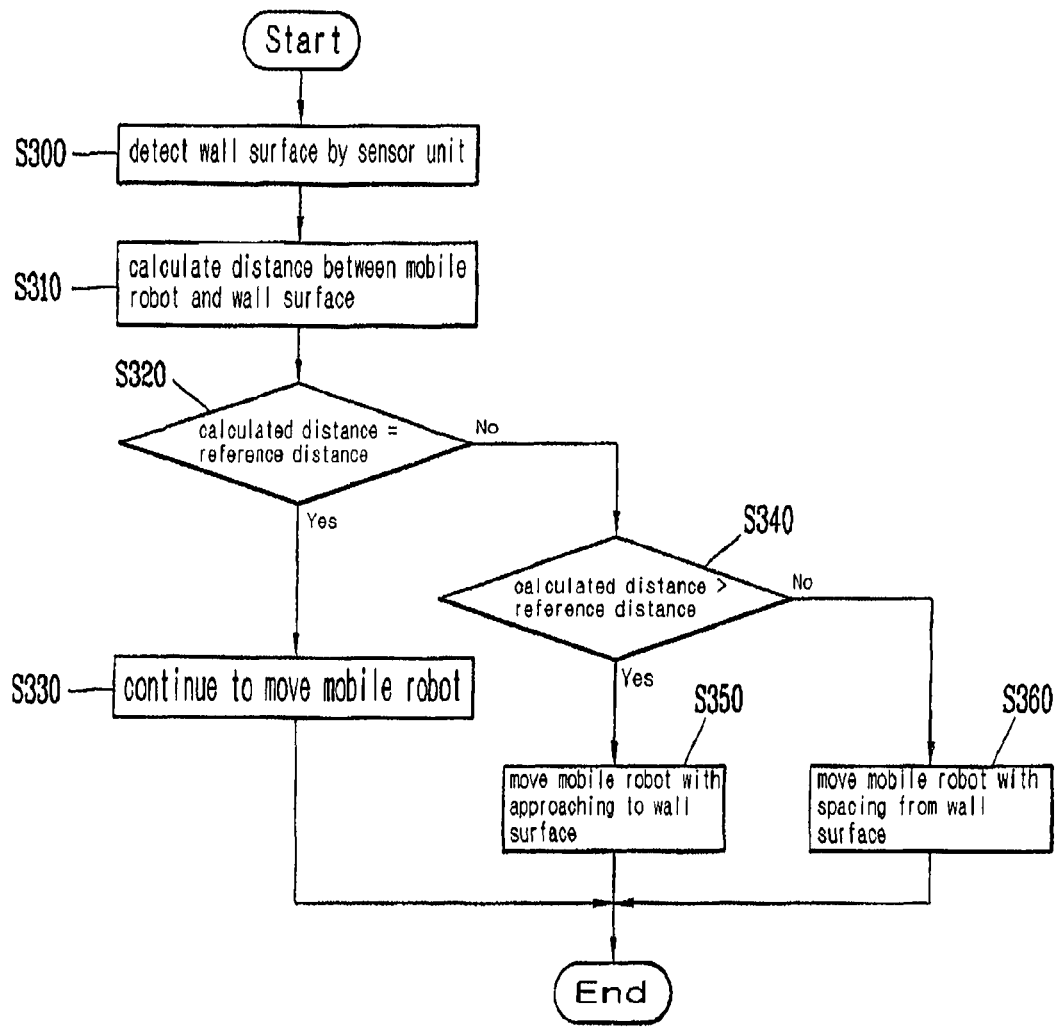
FIG. 12 is a flowchart showing a controlling method for a mobile robot according to a first embodiment of the present invention.

FIG. 12 is a flowchart showing a controlling method for a mobile robot according to a first embodiment of the present invention.

The controlling method for the mobile robot 100 according to the present invention may comprise sensing a wall surface near the mobile robot 100 by the sensor unit 120; and moving the mobile robot 100 while constantly maintaining a distance from the wall surface, based on values detected by the sensor unit 120.

The step of moving the mobile robot 100 may include calculating a distance between the wall surface and the mobile robot 100 based on values detected by the sensor unit 120; and moving the mobile robot 100 with constantly maintaining a distance between the mobile robot 100 and the wall surface, by comparing the calculated distance therebetween with a reference distance and thereby controlling the distance therebetween.

Hereinafter, a controlling method for a mobile robot according to a first embodiment of the present invention will be explained in more detail with reference to FIG. 12.

Firstly, the sensor unit 120 senses a wall surface near the mobile robot 100 (S300). Then, information about the wall surface detected by the sensor unit 120 is transmitted to the controller 210.

The controller 210 calculates a distance between the mobile robot 100 and the wall surface based on the received information (S310).

Then, the controller 210 judges whether the calculated distance corresponds to a reference distance (S320).

If it is judged that the calculated distance corresponds to the reference distance (S320), the controller 210 recognizes that the mobile robot 100 moves with maintaining a constant distance from the wall surface. Accordingly, the controller 210 sends a signal to the driving unit 230 so that the mobile robot 100 can continue to move (S330).

However, if it is judged that the calculated distance does not correspond to the reference distance (S320), the controller judges whether the calculated distance is longer than the reference distance (S340).

When the calculated distance is longer than the reference distance as a result of the judgment (S340), the controller 210 recognizes that the mobile robot 100 moves with maintaining a distance longer than the reference distance. Accordingly, the controller 210 sends a signal to the driving unit 230 so that the mobile robot 100 can move with approaching to the wall surface (S350).

When the calculated distance is shorter than the reference distance as a result of the judgment (S340), the controller 210 recognizes that the mobile robot 100 moves with maintaining a distance shorter than the reference distance. Accordingly, the controller 210 sends a signal to the driving unit 230 so that the mobile robot 100 can move with spacing from the wall surface (S360).

Through the above processes, the mobile robot 100 can move with maintaining a constant distance from the wall surface.

Here, the order of steps S320 and S340 is merely exemplary, and thus the order may be changed each other. Also, the steps may include judging whether the calculated distance is shorter than the reference distance.

As aforementioned, in the mobile robot and the controlling method thereof, a plurality of sending portions and receiving portions are arranged in an alternating manner, thereby having a directivity. Also, since signals received through the receiving portions are judged based on a reference value, the area unallowable to be detected for an obstacle sensing is minimized, which allows an obstacle to be detected more accurately.

Furthermore, since the mobile robot can sense a wider area in a horizontal direction, the mobile robot can move to a space having a low height such as a space below a bed or a sofa.

In the mobile robot and the controlling method thereof according to another embodiment of the present invention, the mobile robot can move with constantly maintaining a distance from the wall surface by using a detecting sensor, without having an additional detecting sensor for a wall surface. Accordingly, the mobile robot can implement a sensor unit having a simplified configuration, and reduce the fabrication cost.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A mobile robot, comprising:
   a case; and
   a sensor having two or more sending portions and two or more receiving portions arranged on an outer surface of the case separately and consecutively alternately, wherein the two or more receiving portions comprise:
      at least one first receiving portion disposed at a front center portion of the case;
      at least one second receiving portion disposed at a left side of the at least one first receiving portion with a spacing distance therebetween; and
      at least one third receiving portion disposed at a right side of the at least one first receiving portion with a spacing distance therebetween, wherein each of the two or more sending portions is configured to emit signals simultaneously maintaining an emitting angle not influencing signals emitted from other immediate adjacent sending portions.

2. The mobile robot of claim 1, wherein the at least one first receiving portion has a receiving sensitivity lower than a receiving sensitivity of each of the at least one second receiving portion and the at least one third receiving portion.

3. The mobile robot of claim 1, wherein the two or more sending portions comprise:
   a first sending portion disposed at a left side of a front center of the case; and
   a second sending portion disposed at a right side of the front center of the case.

4. The mobile robot of claim 1, wherein each of the two or more sending portions has a signal sending sensor of a horn shape.

5. The mobile robot of claim 4, wherein each of the two or more sending portions has an outer end having an oval shape.

6. The mobile robot of claim 5, wherein the oval shape is formed so that a long axis thereof extends perpendicular to the ground.

7. The mobile robot of claim 1, wherein the two or more sending portions are implemented as supersonic sensors.

8. A mobile robot, comprising:
   a case;
   a sensor having two or more sending portions and two or more receiving portions arranged on an outer surface of the case separately and consecutively alternately; and
   a controller that detects a position of an obstacle based on two or more signals received by the sensor, wherein when the obstacle corresponds to a side wall on the basis of a moving path of the mobile robot, the controller calculates a distance between the side wall and the mobile robot based on signals received by the receiving portion closest to the side wall, wherein the two or more sending portions and the two or more receiving portions of the sensor comprise:
      one or more sending portions that send signals to detect the obstacle; and
      a plurality of receiving portions having a number larger than a number of the one or more sending portions by at least one, and forming a region to receive signals sent from the one or more sending portions and reflected by the obstacle.

9. The mobile robot of claim 8, wherein the controller moves the mobile robot by constantly maintaining a distance between a wall surface and the mobile robot according to the calculated distance.

10. The mobile robot of claim 8, wherein the controller calculates a distance between the wall surface and the mobile robot, based on values detected by one pair of portions composed of one of the plurality of receiving portions and one of the one or more sending portions.

11. A method for controlling a mobile robot to detect an obstacle, the method comprising:
   detecting a wall surface around the mobile robot using a sensor having two or more sending portions and two or more receiving portions arranged separately and consecutively alternately; and
   moving the mobile robot by constantly maintaining a distance between the wall surface and the mobile robot according to values detected by the sensor, wherein moving the mobile robot comprises calculating a distance between the wall surface and the mobile robot based on values detected by the sensor, and the calculating a distance between the wall surface and the mobile robot is performed based on values detected by one pair of portions comprising one of the two or more receiving portions and one of the two or more sending portions, simultaneously emitting signals from the sending portions to maintain an angle not influencing signals emitted from other immediate adjacent sending portions.

12. The method of claim 11, wherein the moving the mobile robot further comprises:
   moving the mobile robot while constantly maintaining a distance between the mobile robot and the wall surface by comparing the calculated distance therebetween with a reference distance and thereby controlling a distance therebetween.

13. The method of claim 11, wherein the one pair of portions comprises the receiving portion and the sending portion which are the closest to the wall surface.

14. The mobile robot of claim 1, wherein the at least one first receiving portion comprises a single first receiving portion disposed at a front center of the case.

15. The mobile robot of claim 1, wherein the at least one first receiving portion comprises a pair of first receiving portions disposed adjacent a front center of the case.

16. The mobile robot of claim 1, wherein the at least one second receiving portion comprises a single second receiving portion disposed at a left side of the at least one first receiving portion with a spacing distance therebetween.

17. The mobile robot of claim 1, wherein the at least one second receiving portion comprises a pair of second receiving portions disposed at a left side of the at least one first receiving portion with a spacing distance therebetween.

18. The mobile robot of claim 1, wherein the at least one third receiving portion comprises a single third receiving portion disposed at a right side of the at least one first receiving portion with a spacing distance therebetween.

19. The mobile robot of claim 1, wherein the at least one third receiving portion comprises a pair of third receiving portions disposed at a right side of the at least one first receiving portion with a spacing distance therebetween.

* * * * *